US012731801B2

(12) United States Patent
Paek

(10) Patent No.: US 12,731,801 B2
(45) Date of Patent: Sep. 8, 2026

(54) METHOD OF ACCELERATING ACTIVATION OF FUEL CELL

(71) Applicants: HYUNDAI MOTOR COMPANY, Seoul (KR); KIA CORPORATION, Seoul (KR)

(72) Inventor: Jun Yeol Paek, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 491 days.

(21) Appl. No.: 18/529,755

(22) Filed: Dec. 5, 2023

(65) Prior Publication Data

US 2025/0070200 A1 Feb. 27, 2025

(30) Foreign Application Priority Data

Aug. 24, 2023 (KR) ........................ 10-2023-0110931

(51) Int. Cl.
*H01M 8/04225* (2016.01)
*H01M 8/04111* (2016.01)
*H01M 8/10* (2016.01)

(52) U.S. Cl.
CPC .... *H01M 8/04225* (2016.02); *H01M 8/04111* (2013.01); *H01M 2008/1095* (2013.01)

(58) Field of Classification Search
None
See application file for complete search history.

(56) References Cited

U.S. PATENT DOCUMENTS

2009/0110969 A1* 4/2009 Mohri ............... H01M 8/04291 429/408
2022/0052362 A1* 2/2022 Tsuge ................ H01M 8/04835

FOREIGN PATENT DOCUMENTS

KR 20210109806 A 9/2021
KR 102322392 * 11/2021 ........ H01M 8/04223

OTHER PUBLICATIONS

Yang et al., "Rapid activation of a full-length proton exchange membrane fuel cell stack with a novel intermittent oxygen starvation method," Energy 260 (2022) (Year: 2022).*

* cited by examiner

*Primary Examiner* — Amanda J Barrow
(74) *Attorney, Agent, or Firm* — MCDONNELL BOEHNEN HULBERT & BERGHOFF LLP

(57) ABSTRACT

Disclosed is a method of accelerating activation of a fuel cell, which may reduce an activation time of a fuel cell stack and the amount of hydrogen used. The method includes performing a process of alternately repeating allowance and interruption of supply of air to a fuel cell stack, simultaneously with a current application process of applying a high-current load equal to or greater than a predetermined current to the fuel cell stack. This is done while pressurizing hydrogen to a predetermined pressurization set pressure and supplying the pressurized hydrogen to the fuel cell stack to induce pumping of hydrogen to a cathode of the fuel cell stack in a state of interrupting supply of the air.

20 Claims, 5 Drawing Sheets

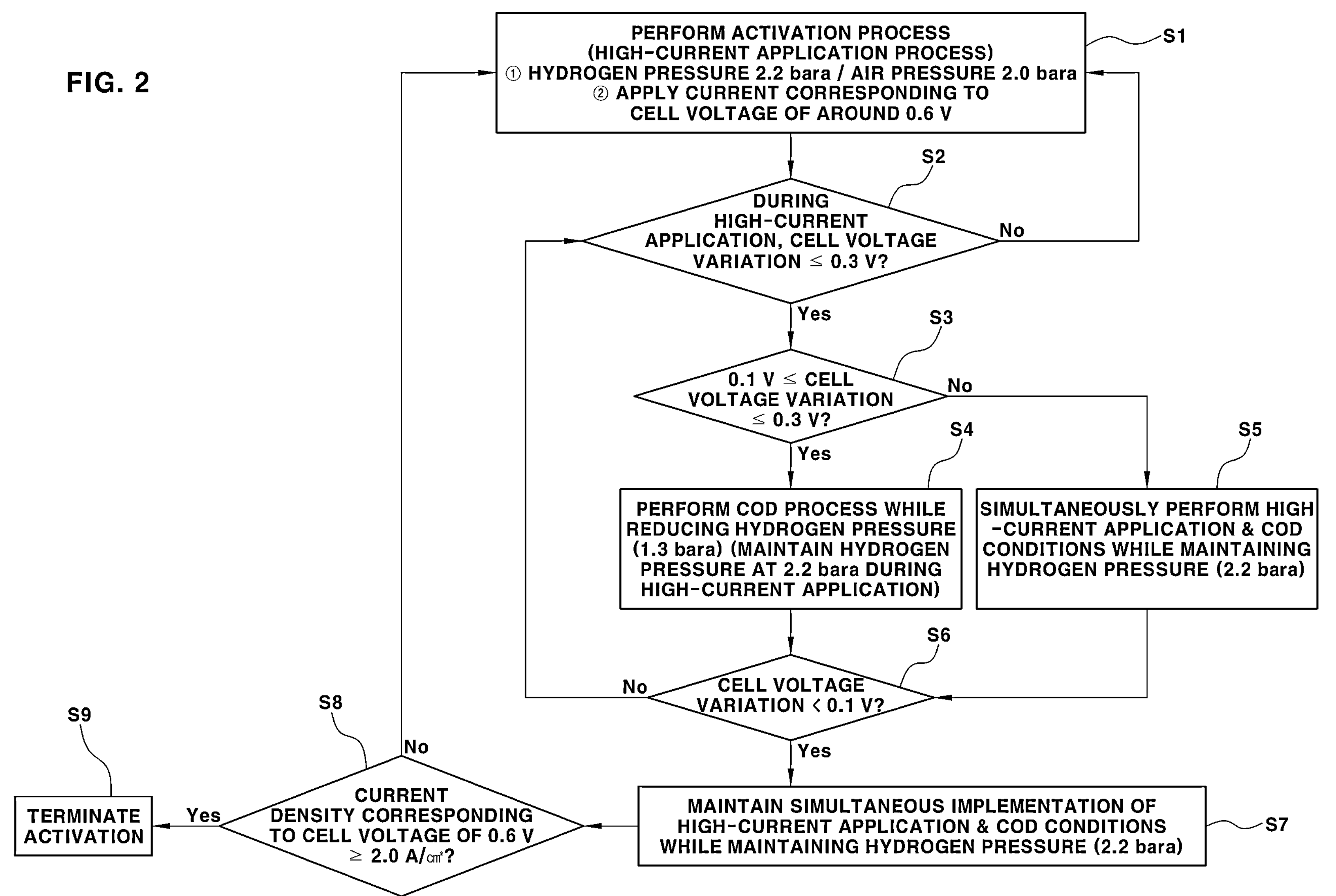
FIG. 2
S1
PERFORM ACTIVATION PROCESS (HIGH-CURRENT APPLICATION PROCESS) ① HYDROGEN PRESSURE 2.2 bara / AIR PRESSURE 2.0 bara ② APPLY CURRENT CORRESPONDING TO CELL VOLTAGE OF AROUND 0.6 V
S2
DURING HIGH-CURRENT APPLICATION, CELL VOLTAGE VARIATION ≤ 0.3 V?
No
Yes
S3
0.1 V ≤ CELL VOLTAGE VARIATION ≤ 0.3 V?
No
Yes
S4
PERFORM COD PROCESS WHILE REDUCING HYDROGEN PRESSURE (1.3 bara) (MAINTAIN HYDROGEN PRESSURE AT 2.2 bara DURING HIGH-CURRENT APPLICATION)
S5
SIMULTANEOUSLY PERFORM HIGH-CURRENT APPLICATION & COD CONDITIONS WHILE MAINTAINING HYDROGEN PRESSURE (2.2 bara)
S6
CELL VOLTAGE VARIATION < 0.1 V?
No
Yes
S7
MAINTAIN SIMULTANEOUS IMPLEMENTATION OF HIGH-CURRENT APPLICATION & COD CONDITIONS WHILE MAINTAINING HYDROGEN PRESSURE (2.2 bara)
S8
CURRENT DENSITY CORRESPONDING TO CELL VOLTAGE OF 0.6 V ≥ 2.0 A/㎠?
No
Yes
S9
TERMINATE ACTIVATION

METHOD OF ACCELERATING ACTIVATION OF FUEL CELL

CROSS REFERENCE TO RELATED APPLICATIONS

This application claims under 35 U.S.C. § 119(a) the benefit of priority to Korean Patent Application No. 10-2023-0110931 filed on Aug. 24, 2023, the entire contents of which are incorporated herein by reference.

BACKGROUND

(a) Technical Field

The present disclosure relates to a method of activating a fuel cell. More particularly, the present disclosure relates to a method of accelerating activation of a fuel cell, which may reduce an activation time of a fuel cell stack and the amount of hydrogen used.

(b) Background

In general, a polymer electrolyte membrane fuel cell (or proton exchange membrane fuel cell (PEMFC)) having high power density is mainly used as a fuel cell for vehicles. The polymer electrolyte membrane fuel cell uses hydrogen as fuel gas, and uses oxygen or air containing oxygen as oxidant gas.

The fuel cell includes a cell that generates electrical energy through reaction between the fuel gas and the oxidant gas. Generally, the fuel cell is provided in the form of a stack in which a plurality of cells is stacked in series in order to satisfy a required output level.

In the case of a fuel cell mounted in a vehicle, in order to satisfy a required high output level, several tens to several hundred cells, each of which individually generates electrical energy, are arranged and assembled in the form of a stack.

The cell constituting the fuel cell stack includes a polymer electrolyte membrane that moves hydrogen cations (protons), and further includes a cathode and an anode, which are electrode layers disposed on both surfaces of the electrolyte membrane and to which a catalyst enabling reaction between hydrogen and oxygen is applied. An assembly in which the cathode and the anode as catalyst electrode layers are stacked on both surfaces of the polymer electrolyte membrane is generally called a "membrane electrode assembly (MEA)".

In addition, the cell of the fuel cell stack further includes gas diffusion layers (GDLs) stacked on outer sides of the cathode and the anode and separators stacked on outer sides of the gas diffusion layers in order to supply fuel and discharge water through flow paths.

Meanwhile, during initial operation of the fuel cell stack after being assembled and manufactured, activity of electrochemical reaction is low. Therefore, it is necessary to perform a fuel cell activation process in a stacked state in order to secure normal initial performance to the maximum extent.

The purpose of fuel cell activation, which is also called "pre-conditioning" or "break-in", is to secure a hydrogen ion channel by activating a catalyst that does not react and sufficiently hydrating electrolytes contained in the electrolyte membrane and the electrodes (the cathode and the anode).

In order for the fuel cell stack to exhibit normal performance after being assembled, the fuel cell stack activation process is performed for the purposes of securing a three-phase electrode reaction area, removing impurities from the polymer electrolyte membrane or the electrodes, and improving ionic conductivity of the polymer electrolyte membrane.

One conventional method of accelerating activation of a fuel cell stack includes pressurized hydrogen being supplied in a process of applying a high-current load to the fuel cell stack (high-current discharge process) and a process of maintaining shutdown of the fuel cell stack during an activation process, thereby preventing reverse diffusion of water from a cathode (air electrode) and reducing the amount of oxygen remaining in the cathode.

Conventionally, a process of discharging a high current for a predetermined period of time and a process in which pulse discharge is performed in a shutdown state for a predetermined period of time are repeated several tens of times. However, the activation process through pulse discharge has a problem in that not only a process time but also the amount of hydrogen used greatly increases. In the current fuel cell stack mass production process, the activation process is the most time-consuming, labor-intensive, and costly.

To achieve efficient mass production of fuel cell vehicles, there is need for an activation process capable of shortening a process time and reducing the amount of hydrogen used for activation by further accelerating activation of a fuel cell stack.

The above information disclosed in this Background section is only for enhancement of understanding of the background of the disclosure, and therefore it may contain information that does not form the related art that is already known in this country to a person of ordinary skill in the art.

SUMMARY

The present disclosure has been made in an effort to solve the above-described problems associated with the related art, and it is an object of the present disclosure to provide a method of accelerating activation of a fuel cell, which may reduce an activation time of a fuel cell stack and the amount of hydrogen used.

The objects of the present disclosure are not limited to the objects mentioned above, and other objects not mentioned herein may be clearly understood by those skilled in the art to which the present disclosure pertains (hereinafter referred to as "persons of ordinary skill") from the following description.

In one aspect, the present disclosure provides a method of accelerating activation of a fuel cell, the method including performing a process of alternately repeating allowance and interruption of supply of air to a fuel cell stack simultaneously with a current application process of applying a high-current load equal to or greater than a predetermined current to the fuel cell stack while pressurizing hydrogen to a predetermined pressurization set pressure and supplying the pressurized hydrogen to the fuel cell stack to induce pumping of hydrogen to a cathode of the fuel cell stack in a state of interrupting supply of the air.

In a preferred embodiment, the method may further include reducing pressure of the hydrogen supplied to the fuel cell stack to a predetermined reduction set pressure lower than the pressurization set pressure simultaneously with the process of alternately repeating allowance and interruption of supply of air to the fuel cell stack during the current application process.

In another preferred embodiment, one of the performing and the reducing may be selected and implemented depending on a cell voltage state of the fuel cell stack.

In still another preferred embodiment, the cell voltage state of the fuel cell stack may be a cell voltage variation representing a difference between an average cell voltage and a minimum cell voltage of the fuel cell stack.

In yet another preferred embodiment, when a cell voltage variation representing a difference between an average cell voltage and a minimum cell voltage of the fuel cell stack is less than a predetermined first voltage, the performing step may be implemented.

In still yet another preferred embodiment, the first voltage may be 0.1 V.

In a further preferred embodiment, when a cell voltage variation representing a difference between an average cell voltage and a minimum cell voltage of the fuel cell stack is in the range of a predetermined first voltage to a predetermined second voltage, the reducing may be implemented.

In another further preferred embodiment, the first voltage may be 0.1 V, and the second voltage may be 0.3 V.

In still another further preferred embodiment, the method may further include executing only the current application process of applying the high-current load to the fuel cell stack while pressurizing hydrogen and air to respective predetermined pressurization set pressures and supplying the pressurized hydrogen and air to the fuel cell stack, and one of the performing, the reducing, and the executing may be selected and implemented depending on a cell voltage state of the fuel cell stack.

In yet another further preferred embodiment, the cell voltage state of the fuel cell stack is a cell voltage variation representing a difference between an average cell voltage and a minimum cell voltage of the fuel cell stack, and when the cell voltage variation is greater than a predetermined second voltage, the executing step is implemented.

In still yet another further preferred embodiment, the second voltage may be 0.3 V.

In a still further preferred embodiment, the method may further include executing only the current application process of applying the high-current load to the fuel cell stack while pressurizing hydrogen and air to respective predetermined pressurization set pressures and supplying the pressurized hydrogen and air to the fuel cell stack, and one of the performing and the executing may be selected and implemented depending on a cell voltage state of the fuel cell stack.

In a yet still further preferred embodiment, the cell voltage state of the fuel cell stack may be a cell voltage variation representing a difference between an average cell voltage and a minimum cell voltage of the fuel cell stack.

In a yet still further preferred embodiment, when a cell voltage variation representing a difference between an average cell voltage and a minimum cell voltage of the fuel cell stack is less than a predetermined first voltage, the performing may be implemented, and when the cell voltage variation is greater than a predetermined second voltage, the executing may be implemented.

In a yet still further preferred embodiment, the first voltage may be 0.1 V, and the second voltage may be 0.3 V.

In a yet still further preferred embodiment, in the executing, the pressurization set pressure of the hydrogen supplied to the fuel cell stack may be set to be higher than the pressurization set pressure of the air supplied to the fuel cell stack.

In a yet still further preferred embodiment, in the executing, the pressurization set pressure of the hydrogen may be set to be higher than the pressurization set pressure of the air by 20 kPa.

In a yet still further preferred embodiment, in the executing, the flow rate of the hydrogen supplied to the fuel cell stack and the flow rate of the air supplied to the fuel cell stack may be set to a ratio of 1.5 to 2.0.

In a yet still further preferred embodiment, the predetermined current may be 400 A.

Other aspects and preferred embodiments of the disclosure are discussed herein.

It is understood that the term "vehicle" or "vehicular" or other similar terms as used herein are inclusive of motor vehicles in general such as passenger automobiles including sport utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 2 is a flowchart showing a fuel cell activation process according to the present disclosure;

FIG. 6 is a diagram showing voltage and air supply states in an activation process according to a comparative example;

FIG. 7 is a diagram for explaining a reason why the pressure of hydrogen is set to be higher than the pressure of air in the activation process according to the present disclosure.

Figure 1:
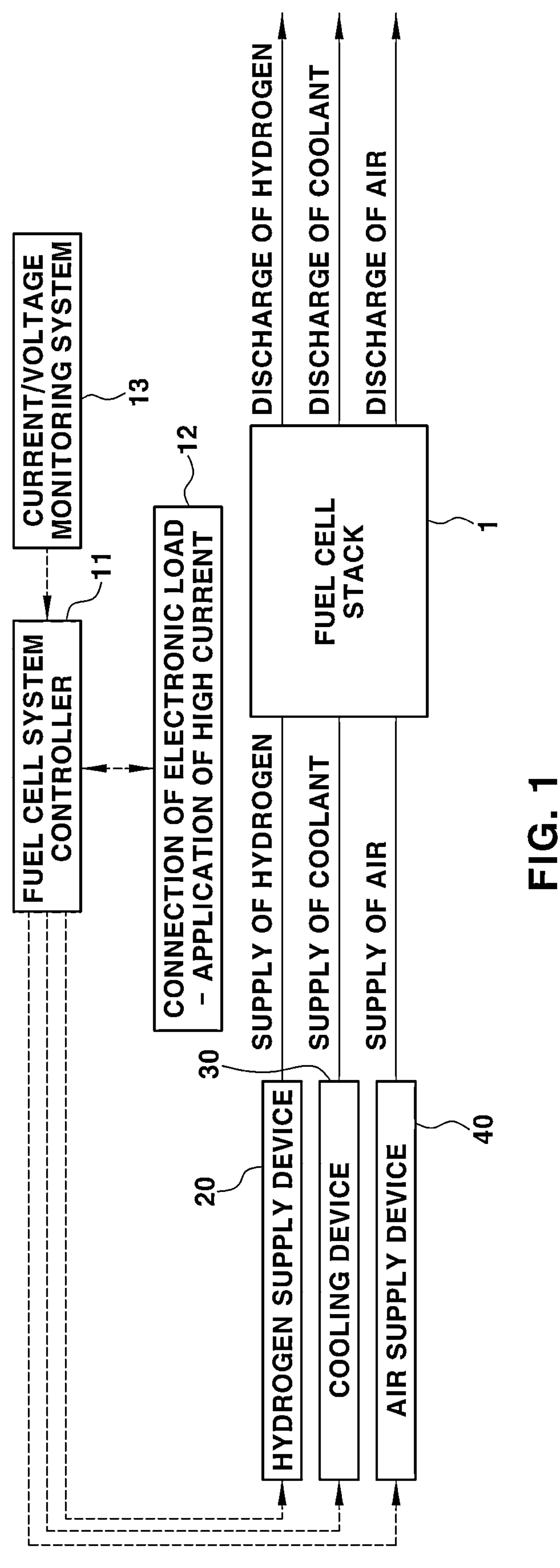
FIG. 1 is a block diagram showing main components of an apparatus for activating a fuel cell according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Various exemplary embodiments will now be described more fully with reference to the accompanying drawings, in which only some exemplary embodiments are shown. Specific structural and functional details disclosed herein are merely representative for the purpose of describing exemplary embodiments. The present disclosure, however, may be embodied in many alternate forms, and should not be construed as being limited only to the exemplary embodiments set forth herein. Accordingly, while exemplary embodiments of the disclosure are capable of being variously modified and taking alternative forms, embodiments thereof are shown by way of example in the drawings and will herein be described in detail. It should be understood, however, that there is no intent to limit the present disclosure to the particular exemplary embodiments disclosed. On the contrary, exemplary embodiments are to cover all modifications, equivalents, and alternatives falling within the scope of the disclosure.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the exemplary embodiments of the present disclosure.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g. "between" versus "directly between", "adjacent" versus "directly adjacent", etc.).

Wherever possible, the same reference numbers will be used throughout the drawings to refer to the same or like parts. The terminology used herein is for the purpose of describing particular embodiments only and is not intended to be limiting of exemplary embodiments of the disclosure. As used herein, the singular forms "a", "an", and "the" are intended to include the plural forms as well, unless the context clearly indicates otherwise. It will be further understood that the terms "comprises", "comprising", "includes", and/or "including", when used herein, specify the presence of stated components, steps, operations, and/or elements, but do not preclude the presence or addition of one or more other components, steps, operations, and/or elements.

The present disclosure relates to a method of accelerating activation of a fuel cell, which may reduce an activation time of a fuel cell stack and the amount of hydrogen used.

The present disclosure provides a method of accelerating activation of a fuel cell stack, which prevents water from reversely diffusing from a cathode (air electrode) to an anode (hydrogen electrode) by supplying pressurized hydrogen in a high-current load application process and a shutdown process, thereby accelerating activation of the fuel cell stack, thus effectively shortening an activation time and reducing the amount of hydrogen used for activation.

As described above, as conventional technology for accelerating activation of a fuel cell stack, there is a method of reducing the amount of oxygen remaining in a cathode by preventing reverse diffusion of water from an air electrode by supplying pressurized hydrogen in a process of applying a high-current load to the fuel cell stack and a shutdown process during an activation process.

However, since the high-current load application (high-current discharge) process and creation and application of cathode oxygen depletion (COD) conditions are carried out separately, a process time may be long. Further, in the COD process for creation and application of the COD conditions, shutdown is performed while applying a low-current load, and thus hydrogen pumping effect may be small.

In contrast, according to the present disclosure, COD conditions are intermittently applied while a high-current load is applied, thereby maximizing hydrogen pumping effect, thus effectively shortening an activation time. In other words, the present disclosure proposes an activation acceleration mode in which application of a high-current load and application of COD conditions are performed simultaneously in order to minimize an activation time and maximize hydrogen pumping effect.

FIG. 1 is a block diagram showing main components of an apparatus for activating a fuel cell according to the present disclosure, and FIG. 2 is a flowchart showing a fuel cell activation process according to the present disclosure. As shown in FIG. 1, the configuration of the apparatus for activating a fuel cell stack and the configuration of a conventional fuel cell system remain the same.

That is, the apparatus for activating a fuel cell stack includes a fuel cell system controller 11, which performs overall control of a fuel cell system including a driving unit for operation of a fuel cell stack 1 and controls the operating state and operating conditions of the fuel cell stack 1, a state diagnosis controller 12, which diagnoses the state of the fuel cell system, and a current/voltage monitoring system 13, which monitors the current and voltage of the fuel cell stack 1.

The fuel cell system controller 11 may be configured to control operating conditions of the fuel cell system, such as temperature, pressure, and humidification of the fuel cell system. However, a separate control system that controls the operating conditions such as temperature, pressure, and humidification through cooperative control with the fuel cell system controller 11 may alternatively be provided. In addition, although not shown in the drawings, an electric control and driving system may be provided.

Such an electric control and driving system may include an electronic load 2 shown in FIG. 3, which will be described later, and an opening/closing unit (not shown) configured to allow or interrupt electrical connection of the electronic load 2 to the fuel cell stack 1. In this case, the operation of the electronic load 2 and the opening/closing unit may be controlled by the fuel cell system controller 11.

In addition, the apparatus for activating the fuel cell stack further includes a hydrogen supply device 20, which supplies hydrogen as fuel gas to the fuel cell stack 1 and discharges hydrogen from the fuel cell stack 1, an air supply device 40, which supplies air as oxidant gas to the fuel cell stack 1 and discharges air from the fuel cell stack 1, and a cooling device 30, which supplies coolant to the fuel cell stack 1 and discharges coolant that has passed through the fuel cell stack 1.

In FIG. 1, reference numeral "1" denotes the fuel cell in a stacked state, i.e. the fuel cell stack. Hydrogen may be supplied to an inlet of an anode (a hydrogen electrode or a fuel electrode) of the fuel cell stack 1, and unreacted hydrogen may be discharged from an outlet of the anode of the fuel cell stack 1 by the hydrogen supply device 20. In addition, air may be supplied to an inlet of a cathode (an air electrode) of the fuel cell stack 1, and air and hydrogen may be discharged from an outlet of the cathode of the fuel cell stack 1 by the air supply device 40.

Similarly, coolant may be supplied to an inlet of a coolant channel of the fuel cell stack 1, and coolant may be discharged from an outlet of the coolant channel of the fuel cell stack 1 by the cooling device 30. In the configuration of the apparatus shown in FIG. 1, the fuel cell stack 1 may be referred to as a reaction unit, and the hydrogen supply device 20, the air supply device 40, the cooling device 30, and the electric control and driving system may be collectively referred to as a driving unit.

The present disclosure includes an air flow control method for shortening an activation time of the fuel cell stack. The present disclosure provides a method of increasing an activation speed of the fuel cell stack, which is a core component of the fuel cell system, by controlling hydrogen and air supply operating conditions in a simple manner using existing components without additionally using a separate component other than the components of a general fuel cell system.

The fuel cell stack activation process according to the present disclosure may be performed by mounting the fuel cell stack 1 in the apparatus shown in FIG. 1. In addition, the fuel cell stack activation process may be performed under the control of the controllers of the system for activation, i.e. the above-described fuel cell system controller 11 and state diagnosis controller 12.

Although the fuel cell stack activation process according to the present disclosure is described as being performed under the control of a plurality of controllers, i.e. the fuel cell system controller 11 and the state diagnosis controller 12, the fuel cell stack activation process according to the present disclosure may be performed by a single integrated control element rather than a plurality of controllers.

The plurality of controllers and the single integrated control element may be collectively referred to as a controller. In the following description, the "controller" is the collectively called controller. The activation acceleration process according to the present disclosure to be described below may be controlled by the controller. The driving unit including the hydrogen supply device 20, the air supply device 40, the cooling device 30, and the electronic load (denoted by reference numeral "2" in FIG. 3 and FIG. 4) is controlled by the controller.

Figure 3:
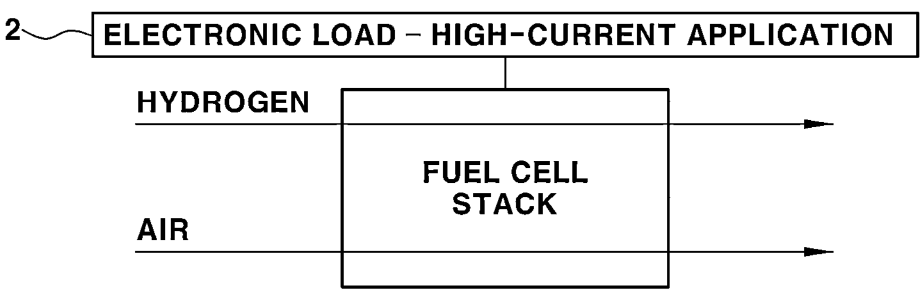
FIG. 3 is a diagram showing a high-current application process in the fuel cell activation process according to the present disclosure.
Figure 4:
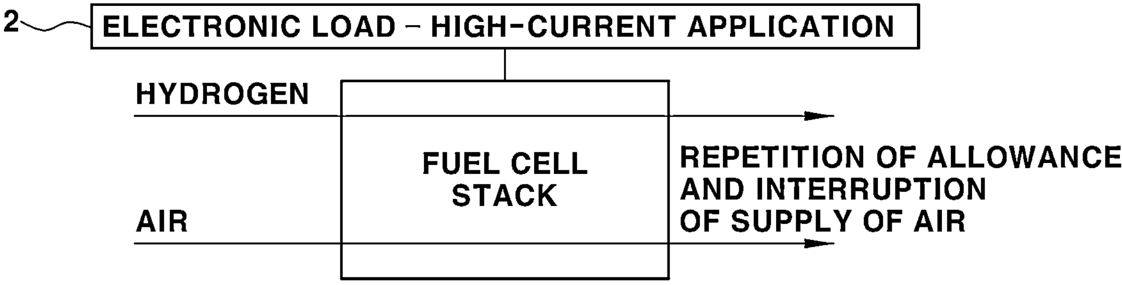
FIG. 4 is a diagram showing a COD process for creation and application of COD conditions in the fuel cell activation process according to the present disclosure.

FIG. 3 is a diagram showing the high-current application process in the fuel cell activation process according to the present disclosure, and FIG. 4 is a diagram showing the COD process for creation and application of the COD conditions in the fuel cell activation process according to the present disclosure.

The method of accelerating activation of the fuel cell stack according to the present disclosure includes a high-current application process of applying a high-current load to the fuel cell stack 1 in a state of electrically connecting the electronic load 2 to the fuel cell stack 1 while supplying and discharging humidified and pressurized hydrogen and pressurized air to and from the fuel cell stack 1. In the high-current application process, a high current equal to or greater than a predetermined current is applied from the fuel cell stack 1 to the electronic load 2.

In addition, the method of accelerating activation of the fuel cell stack according to the present disclosure further includes a COD process of applying a high current to the electronic load 2 in a state of electrically connecting the electronic load 2 to the fuel cell stack 1 while supplying humidified and pressurized hydrogen to the fuel cell stack 1 and, at the same time, alternately repeating allowance and interruption of supply of pressurized air to the fuel cell stack 1. The COD process is a process for creating and applying COD conditions of the fuel cell stack.

In the high-current application process, as shown in FIG. 3, in the state in which the electronic load 2 is electrically connected to the fuel cell stack 1, hydrogen is supplied to the anode of the fuel cell stack 1 by the hydrogen supply device 20, and air is supplied to the cathode of the fuel cell stack 1 by the air supply device 40.

A pressurization system capable of supplying pressurized hydrogen and air to the fuel cell stack 1 is applied to the apparatus for activating the fuel cell stack illustrated in FIG. 1. In the high-current application process, hydrogen pressurized to a predetermined pressure and humidified to a highly humidified state is supplied to the inlet of the anode of the fuel cell stack 1 by the hydrogen supply device 20, and, at the same time, air pressurized to a predetermined pressure is supplied to the inlet of the cathode of the fuel cell stack 1 by the air supply device 40 (pressurization of hydrogen and air).

Accordingly, in the high-current application process, a high current generated by and output from the fuel cell stack 1 may be applied to the electronic load 2 (application of a high-current), and discharge thereof by the electronic load 2 may be performed. In this case, control of other environmental conditions, such as control of supply of coolant to the fuel cell stack 1 and control of temperature of the fuel cell stack 1, may be performed.

In addition, the process of creating and applying COD conditions, i.e. the COD process, includes a process of inducing pumping of hydrogen to the cathode (air electrode) of the fuel cell stack by supplying only pressurized hydrogen to the fuel cell stack.

In the COD process, as shown in FIG. 4, while a high-current load is applied in the state in which the electronic load 2 is electrically connected to the fuel cell stack 1, hydrogen is supplied to the anode of the fuel cell stack 1 by the hydrogen supply device 20. In this case, in the state in which pressurization of hydrogen supplied to the fuel cell stack is maintained, the operation of the air supply device 40 is controlled such that allowance and interruption of supply of air to the cathode of the fuel cell stack are alternately repeated.

In the COD process, hydrogen pressurized to a predetermined pressure and humidified to a highly humidified state is supplied to the inlet of the anode of the fuel cell stack 1 by the hydrogen supply device 20. At the same time, in the state in which supply of hydrogen is maintained, allowance and interruption of supply of air to the cathode of the fuel cell stack 1 are alternately repeated. While supply of air is interrupted, pressurized hydrogen alone is supplied to the fuel cell stack.

In this case, a process in which air pressurized to a predetermined pressure is supplied to the inlet of the cathode of the fuel cell stack 1 by the air supply device 40 simultaneously with supply of pressurized hydrogen (pressurization and supply of hydrogen and air) and a process in which supply of air is interrupted in the state in which supply of pressurized hydrogen is maintained (pressurization and supply of hydrogen and interruption of supply of air) are alternately repeated.

Accordingly, in the COD process, a process of inducing pumping of hydrogen to the cathode (air electrode) of the fuel cell stack may be performed by supplying only hydrogen to the fuel cell stack 1.

In addition, according to the present disclosure, the current application process (high-current application process) and the COD process (COD condition creating process) are performed simultaneously, whereby an activation time is further shortened.

In other words, the high-current application process of operating the fuel cell stack such that a high current is applied in the state in which the electronic load 2 having set current density is connected to the fuel cell stack 1 and the COD process of pumping hydrogen to a reaction surface of the cathode (air electrode) are alternately repeated several times. In order to shorten a process time and increase efficiency, the high-current application process and the COD process may be performed simultaneously.

Hereinafter, the activation acceleration process according to the present disclosure will be described in more detail.

First, in the high-current application process, the operation of the hydrogen supply device 20 and the air supply device 40 is controlled such that pressurized hydrogen is supplied to the anode of the fuel cell stack 1 by the hydrogen supply device 20, and, at the same time, pressurized air is supplied to the cathode of the fuel cell stack 1 by the air supply device 40 (step S1 in FIG. 2).

For example, hydrogen and air may be supplied to the fuel cell stack in a state of being pressurized to respective predetermined pressurization set pressures, for example, 2.2 bara and 2.0 bara. As such, since hydrogen and air, which are reactant gases, are pressurized and supplied to the fuel cell stack, it is possible to obtain an effect of reducing reactant gas diffusion resistance.

In addition, the pressure of hydrogen is increased in order to prevent generation of back pressure between hydrogen outlet pressure, which is the pressure of hydrogen discharged from the cell of the fuel cell stack, and air inlet pressure, which is the pressure of air supplied to the cell of the fuel cell stack. In this case, the pressure of hydrogen may be set to be higher than the pressure of air by at least 0.2 bara (=20 kPa).

In addition, the supply flow rates of the reactant gases are calculated based on the stoichiometric ratio. For example, hydrogen and air may be supplied at a ratio of 1.5 to 2.0. That is, the flow rate of hydrogen supplied to the anode (hydrogen electrode) of the fuel cell stack and the flow rate of air supplied to the cathode (air electrode) are set to a ratio of 1.5 to 2.0.

In addition, application of a high current is performed such that a high current equal to or greater than a predetermined current is applied from the fuel cell stack to the electronic load by electrically connecting the electronic load to the fuel cell stack in the state in which reactant gases are pressurized and supplied to the fuel cell stack (application of a high-current), that is, discharge of a high current of the stack to the electronic load). In this case, a high current of 400 A or more may be applied.

In addition, in this case, when a process from application of a high current from the fuel cell stack to the electronic load for a predetermined period of time (discharge of a high current of the fuel cell stack to the electronic load) to release of the application state is defined as one pulse-type high-current application cycle, this cycle may be repeated several times (discharge of a high-current pulse).

In this case, the cycle in which a high current is applied to the electronic load is repeated several times so that the operating voltage (cell voltage) of the fuel cell stack is maintained at a voltage value of 0.6 V or more or around 0.6 V (step S1 in FIG. 2).

The reason for this is to increase speed of stabilization of the amount of platinum. The speed of stabilization of the amount of platinum may be increased by repeating the cycle of application of a high current to the electronic load several times.

In addition, according to the present disclosure, the COD process, in which allowance and interruption of supply of air are alternately repeated while supply of pressurized hydrogen is maintained, is performed in the high-current application state. In this case, a process of sweeping the stack voltage from a high voltage to around 0 V is repeated by repeating allowance and interruption of supply of air (creation and application of the COD conditions).

Since allowance and interruption of supply of air are repeated in the high-current application environment, a hydrogen (H2) pumping effect may be maximized, electrochemical reaction that reduces the oxidized catalyst may be maximized, and the degree of activation may be increased.

As described above, according to the present disclosure, the high-current application process and the COD process are performed simultaneously. When a cell voltage variation (average cell voltage-minimum cell voltage) is less than a predetermined first voltage, e.g. 0.1 V, during the high-current application cycle, the high-current application process and the COD process in which allowance and interruption of supply of air are alternately repeated are performed simultaneously in the state in which the pressure of hydrogen in a pressurized state is maintained at the aforementioned pressurization set pressure, i.e. 2.2 bara (maximization of hydrogen pumping effect) (steps S3 to S7 in FIG. 2).

In addition, when the cell voltage variation exceeds a predetermined second voltage (first voltage<second voltage), e.g. 0.3 V, during the high-current application cycle, only the high-current application process is performed without the COD process for creation and application of the COD conditions (steps S1 and S2 in FIG. 2).

A cell of the stack in which the cell voltage variation is greater than the second voltage (0.3 V) is likely to be determined to be a defective cell after manufacture of the stack. If the COD conditions are applied when the state of the catalyst is poor, the stack may be damaged and may pose a safety hazard due to heat generation.

In addition, when the cell voltage variation is in the range of the first voltage to the second voltage (e.g. 0.1 V to 0.3 V) during the high-current application cycle, the high-current application process and the COD process in which allowance and interruption of supply of air are alternately repeated are performed simultaneously. However, when the cell voltage variation is in the range of the first voltage to the second voltage, hydrogen pressure reduction conditions are applied to the COD process. That is, during the COD process, the pressure of hydrogen supplied to the fuel cell stack may be regulated to a predetermined reduction set pressure, e.g. 1.3 bara (steps S3 and S4 in FIG. 2).

A cell of the stack in which the cell voltage variation is in the range of 0.1 V to 0.3 V may also pose a potential hazard. Therefore, in order to regulate the degree of hydrogen pumping, the degree of pressurization of hydrogen is reduced by controlling the pressure of hydrogen to the reduction set pressure.

As described above, in the activation acceleration process according to the present disclosure, the high-current application process and the COD process are performed simultaneously, with a result that an activation time may be shortened by up to 25% compared to the conventional mode (400 seconds→300 seconds per cycle). Further, since a high current is applied during the COD process, it is possible to maximize the hydrogen pumping effect.

The reason why the process conditions are applied differently depending on the cell voltage variation is to prevent damage to the stack and occurrence of an accident during the activation process and to improve the efficiency of the activation process.

Thereafter, when the cell voltage of the fuel cell stack becomes a third voltage while the activation process is repeated, if the current density applied from the fuel cell stack is equal to or greater than a set value, the activation process is terminated. The third voltage as the cell voltage at which the activation process is terminated may be set to 0.6 V, and the set value as the current density at which the activation process is terminated may be set to 2.0 A/cm2 (steps S8 and S9 in FIG. 2).

The current density set value may be set to a value in an output area increased by a predetermined level or more compared to the maximum output area of the vehicle. For example, the current density set value may be set to 2.0 A/cm2 as a value in an output area increased by 33% to 60% compared to the maximum output area of existing mass-produced vehicles and vehicles under development. When this procedure of the activation process is completed, it is possible to assure normal performance of the fuel cell stack after shipment of the vehicle.

Figure 5:
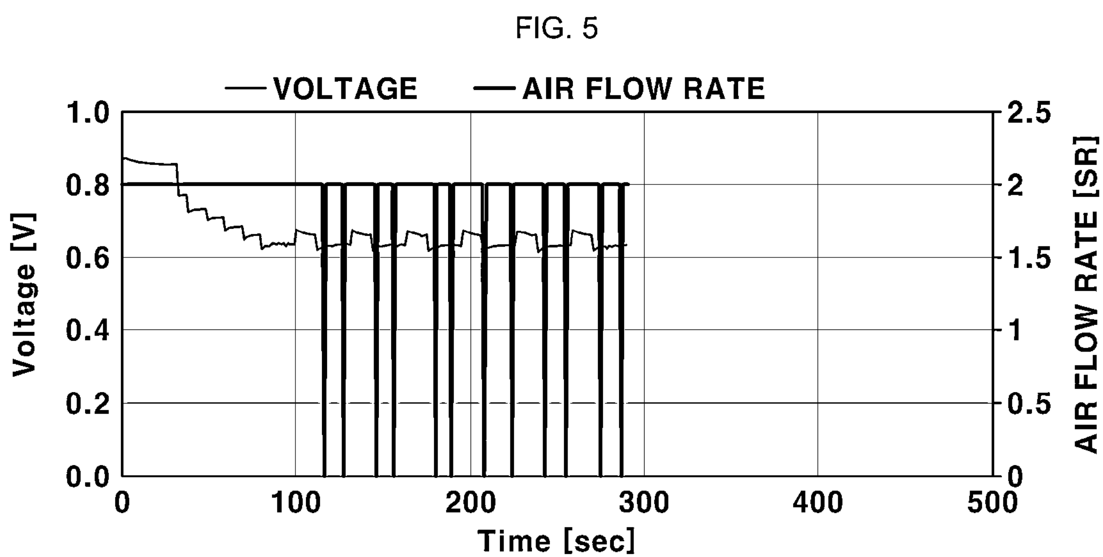
FIG. 5 is a diagram showing voltage and air supply states in the activation process according to an embodiment of the present disclosure.
Figures 6, 7:
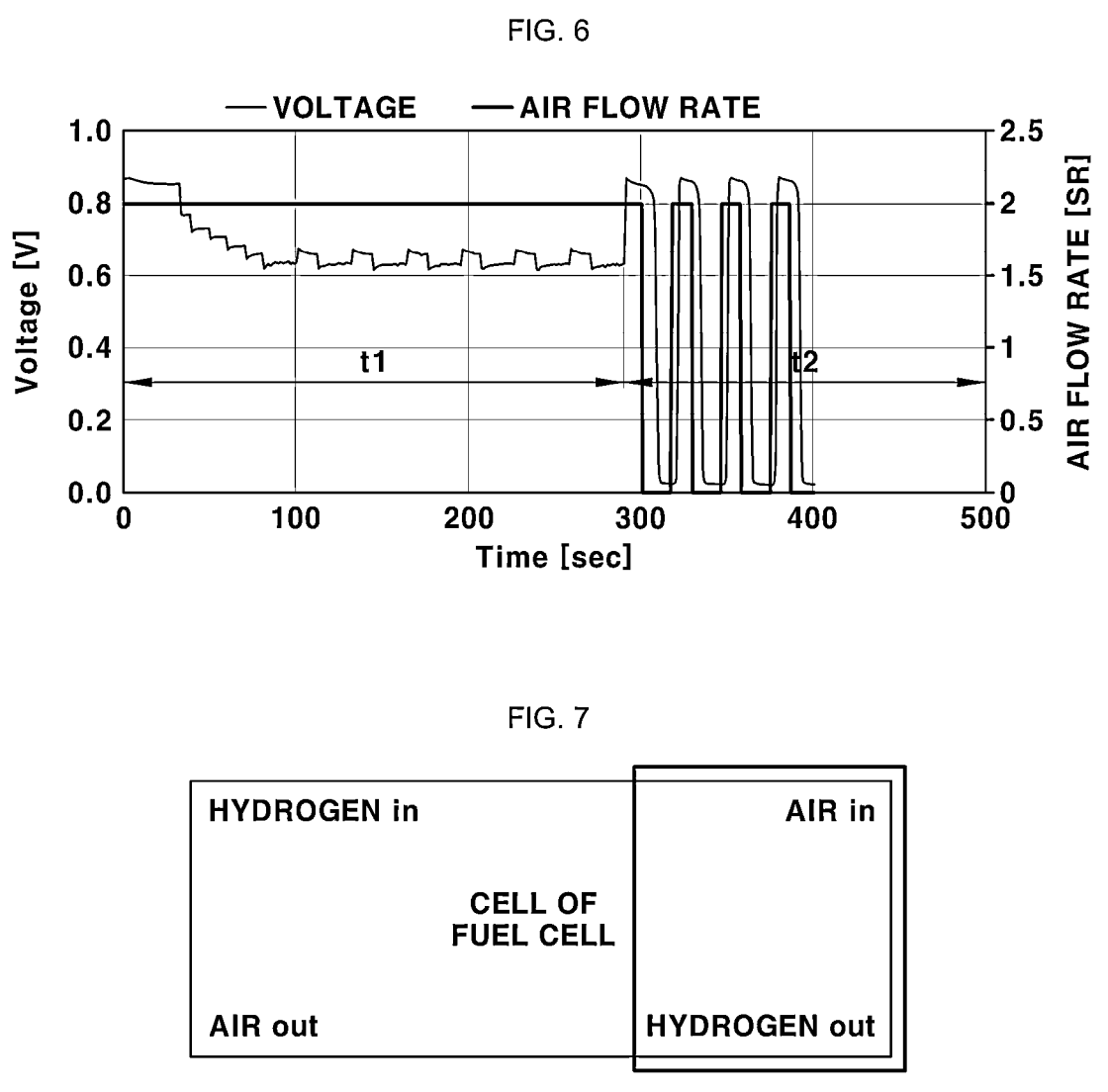

FIG. 5 and FIG. 6 are diagrams for comparison between the activation process of the present disclosure and the conventional activation process. FIG. 5 shows an embodiment of the present disclosure in which the COD conditions are created and applied during high-current activation, and FIG. 6 shows a comparative example.

In the activation mode of the present disclosure, a high current is applied to the electronic load in the state in which the electronic load is electrically connected to the fuel cell stack. In this case, a high current equal to or greater than a predetermined current (e.g. 400 A) is applied to the electronic load. In the state in which pressurization of hydrogen is maintained, when the cell voltage variation is less than the first voltage according to the cell voltage state of the fuel cell stack, the COD process in which allowance and interruption of supply of air are alternately repeated may be performed simultaneously with the high-current application process.

However, as described above, when the cell voltage variation falls between the first voltage and the second voltage during application of a high current, the COD process in which allowance and interruption of supply of air are alternately repeated is performed in the state of the pressure of hydrogen is reduced. In addition, when the cell voltage variation exceeds the second voltage, only the high-current application process is performed.

On the other hand, in the comparative example according to the conventional art, a high-current application process in which a high-current load is applied to the fuel cell stack is first performed while performing control such that hydrogen and air respectively supplied to the anode and the cathode of the fuel cell stack are pressurized. This high-current application process is indicated by section "t1" in FIG. 6. In the high-current application process, the maximum applied current is set to 400 A or more.

After the high-current application process, a process in which allowance and interruption of supply of air are alternately repeated is performed separately. In the process in which allowance and interruption of supply of air are alternately repeated, a current load lower than that in the high-current application process of the present disclosure is applied to the fuel cell stack. In this state, allowance and interruption of supply of air to the fuel cell stack are repeated, and accordingly, voltage sweep in which the stack voltage is swept from a high voltage to around 0 V occurs. This process is indicated by section "t2" in FIG. 6. In the process in which allowance and interruption of supply of air are alternately repeated, a current of 30 A to 40 A is applied.

FIG. 7 is a diagram for explaining a reason why the pressure of hydrogen is set to be higher than the pressure of air in the activation process according to the present disclosure. Based on FIG. 7, the anode inlet (hydrogen inlet), to which hydrogen is supplied, and the cathode outlet (air outlet) may be located on the left side of the cell of the fuel cell stack, and the cathode inlet (air inlet), to which air is supplied, and the anode outlet (hydrogen outlet) may be located on the right side of the cell of the fuel cell stack.

In the fuel cell activation process according to the present disclosure, the pressures of hydrogen and air are controlled to respective pressurization set pressures during the high-current application process. In this case, the pressure of hydrogen may be controlled to be higher than the pressure of air by a predetermined pressure level. For example, during the high-current application process, the pressure of hydrogen and the pressure of air may be controlled to 2.2 bara and 2.0 bara, respectively, and the pressure of hydrogen may be controlled to be higher than the pressure of air by about 20 kPa (=0.2 bara).

The reason for this is to prevent generation of back pressure in the right side of the cell shown in FIG. 7, on which the cathode inlet and the anode outlet are located. In other words, the pressure of air is prevented from exceeding the pressure of hydrogen, thereby minimizing or preventing degradation of the fuel cell stack and the cell during the activation process.

Since pressure loss occurs while the reactant gases pass through the fuel cell stack, the pressures of the reactant gas inlets (the anode inlet and the cathode inlet) are higher than the pressures of the reactant gas outlets (the anode outlet and the cathode outlet) in the cell shown in FIG. 7. If the pressure of the hydrogen inlet and the pressure of the air inlet are controlled to be identical to each other, the pressure of the hydrogen outlet becomes lower than the pressure of the air inlet, leading to generation of back pressure in the right side of the cell shown in FIG. 7.

When back pressure occurs, oxygen in the cathode crosses over to the anode, causing various degradation mechanisms. For example, the electrolyte membrane may be degraded due to generation of hydrogen peroxide, and the electrode may be degraded due to formation of an interface between hydrogen and air in the anode.

In addition, when the cell voltage variation falls between the first voltage (e.g. 0.1 V) and the second voltage (e.g. 0.3 V), the COD process is performed in the state in which the pressure of hydrogen is reduced to a predetermined reduction set pressure (e.g. 1.3 bara).

This is an evaluation condition under which an OCV decay time (ODT) as an electrolyte membrane condition check item (membrane degradation verification) is evaluated in the stack mass production process. It is known that, when the pressure of hydrogen is the reduction set pressure, e.g. 1.3 bara, the possibility of the cell being additionally damaged is minimized.

As described above, the method of accelerating activation of the fuel cell according to the present disclosure is characterized in that the high-current application process and the COD process are performed simultaneously. Voltage sweep is caused by alternately repeating allowance and interruption of supply of air during the high-current application process.

Figure 8:
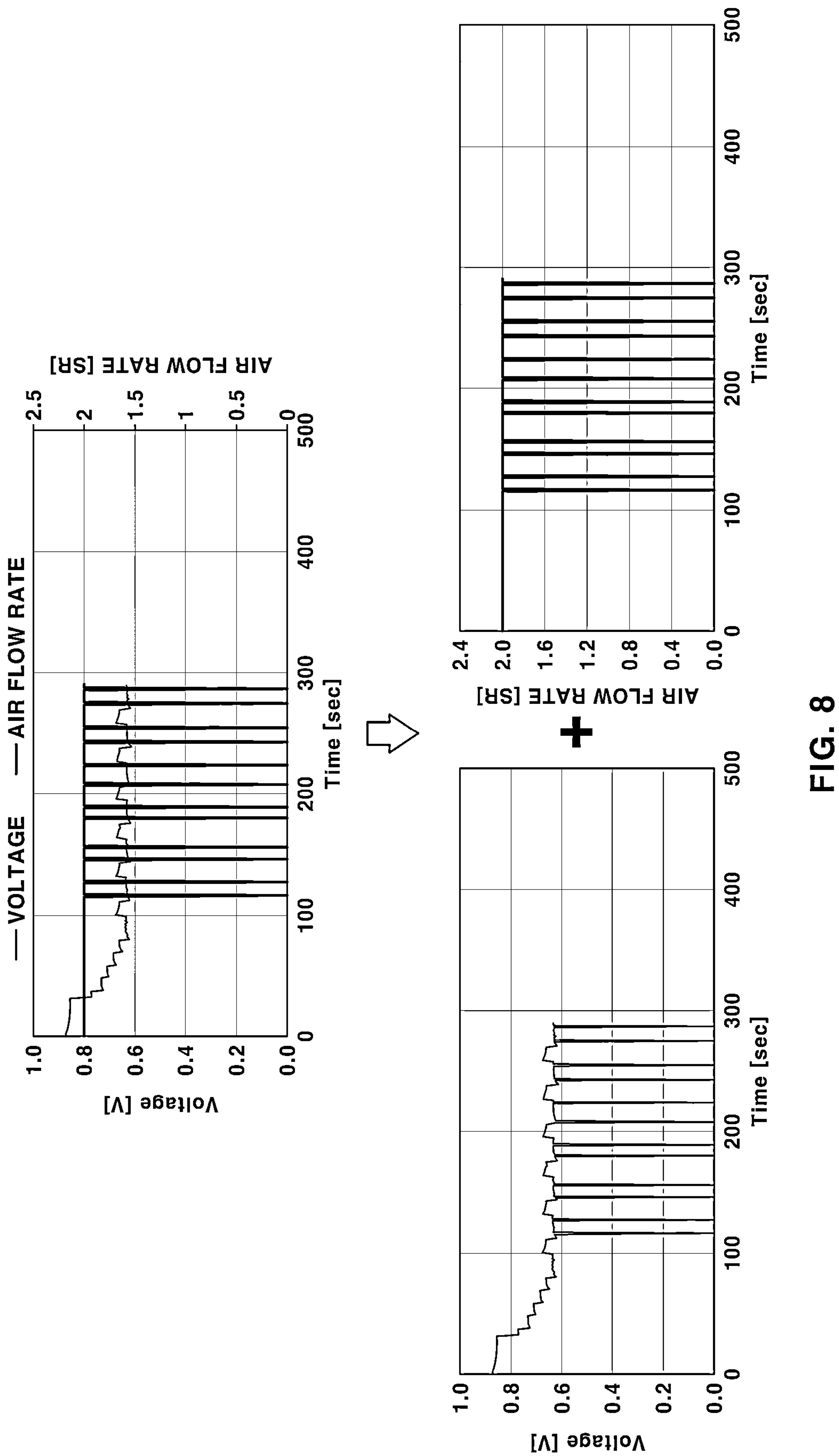
FIG. 8 illustrates a graph indicating a cell voltage and a graph indicating an air flow rate when the high-current application process and the COD process are performed simultaneously in the activation process according to the present disclosure.

FIG. 8 illustrates a graph indicating the cell voltage and a graph indicating the air flow rate when the high-current application process and the COD process are performed simultaneously in the activation process according to the present disclosure. Referring to the air flow rate graph shown in FIG. 8, it is possible to confirm alternate repetition of allowance and interruption of supply of air through changes in the air flow rate SR.

The method of accelerating activation of the fuel cell according to the present disclosure described above in detail has the following effects and advantages.

In the current fuel cell mass production process, a fuel cell stack is produced by stacking an electricity-generating assembly (EGA), which is an assembly of a membrane electrode assembly (MEA) and a gas diffusion layer (GDL), and a separator.

The fuel cell stack produced in this way is not mounted in a vehicle to be operated immediately after production. It is necessary to perform the activation process in order to form an ion transfer channel through hydration of the electrolyte membrane/binder and increase the activity of the catalyst.

In the conventional art, the high-current application process in which a high-current load is applied to the fuel cell stack and the COD process in which allowance and interruption of supply of air are alternately repeated are performed separately, and a low current is applied during the COD process. Thus, an activation time is long, hydrogen pumping effect is poor, and it takes a lot of time to reduce the oxidized catalyst in the cathode.

In contrast, in the present disclosure, since the COD process in which allowance and interruption of supply of air are alternately repeated is performed simultaneously with the high-current application process, an activation time may be shortened (by up to 25%). In addition, since the COD process is performed in the state in which a high current is applied, it is possible to maximize hydrogen pumping effect and thus not only to effectively reduce the oxidized catalyst but also to easily remove impurities. In addition, since the pressurized state of hydrogen is maintained during the COD process, it is possible to induce crossover of hydrogen to the cathode and thus to accelerate the hydrogen pumping phenomenon.

In addition, in the present disclosure, conditions under which whether the high-current application process and the COD process are capable of being performed simultaneously is diagnosed and detailed operating conditions corresponding to the respective diagnosis conditions may be established, thereby minimizing occurrence of an accident and damage to the stack attributable to a defective cell (establishment of a cell voltage variation-based reference).

In the current fuel cell stack mass production process, the activation process is the most time-consuming, labor-intensive, and costly. However, when applied to the current fuel cell stack mass production process, the present disclosure may greatly shorten an activation time (by up to 25%), may reduce the amount of hydrogen used, and may shorten a process time. As a result, it is possible to reduce production costs (labor and material costs) and to increase productivity.

As is apparent from the above description, according to the method of accelerating activation of the fuel cell stack according to the present disclosure, since the COD process in which allowance and interruption of supply of air are alternately repeated is performed simultaneously with the high-current application process, an activation time may be shortened. In addition, since the COD process is performed in the state in which pressurization of hydrogen is maintained during the high-current application process, it is possible to maximize hydrogen pumping effect. Accordingly, it is possible to reduce the amount of hydrogen used and to shorten a process time, resulting in reduction in production costs (labor and material costs) and increase in productivity.

The present disclosure has been described above with reference to an exemplary embodiment. The embodiment described in the specification and shown in the accompanying drawings is illustrative only and is not intended to represent all aspects of the disclosure. Therefore, the present disclosure is not limited to the embodiment presented herein, and it is to be understood by those skilled in the art that various modifications or changes can be made without departing from the technical spirit or scope of the disclosure as disclosed in the appended claims.

What is claimed is:

1. A method of accelerating activation of a fuel cell, the method comprising: performing a process of alternately repeating allowance and interruption of supply of air to a fuel cell stack simultaneously with a current application process of applying a high-current load equal to or greater than a predetermined current to the fuel cell stack while pressurizing hydrogen to a predetermined pressurization set pressure and supplying the pressurized hydrogen to the fuel cell stack to induce pumping of hydrogen to a cathode of the fuel cell stack in a state of interrupting supply of the air.

2. The method of claim 1, further comprising:

reducing pressure of the hydrogen supplied to the fuel cell stack to a predetermined reduction set pressure lower than the pressurization set pressure simultaneously with the process of alternately repeating allowance and interruption of supply of air to the fuel cell stack during the current application process.

3. The method of claim 2, wherein one of the performing and the reducing is selected and implemented depending on a cell voltage state of the fuel cell stack.

4. The method of claim 3, wherein the cell voltage state of the fuel cell stack is a cell voltage variation representing a difference between an average cell voltage and a minimum cell voltage of the fuel cell stack.

5. The method of claim 3, wherein, when a cell voltage variation representing a difference between an average cell voltage and a minimum cell voltage of the fuel cell stack is less than a predetermined first voltage, the performing is implemented.

6. The method of claim 5, wherein the first voltage is 0.1 V.

7. The method of claim 3, wherein, when a cell voltage variation representing a difference between an average cell voltage and a minimum cell voltage of the fuel cell stack is in a range of a predetermined first voltage to a predetermined second voltage, the reducing is implemented.

8. The method of claim 7, wherein the first voltage is 0.1 V, and the second voltage is 0.3 V.

9. The method of claim 2, further comprising:

executing only the current application process of applying the high-current load to the fuel cell stack while pressurizing hydrogen and air to respective predetermined pressurization set pressures and supplying the pressurized hydrogen and air to the fuel cell stack, wherein one of the performing, the reducing, and the executing is selected and implemented depending on a cell voltage state of the fuel cell stack.

10. The method of claim 9, wherein the cell voltage state of the fuel cell stack is a cell voltage variation representing a difference between an average cell voltage and a minimum cell voltage of the fuel cell stack, and wherein, when the cell voltage variation is greater than a predetermined second voltage, the executing is implemented.

11. The method of claim 10, wherein the second voltage is 0.3 V.

12. The method of claim 1, further comprising:

executing only the current application process of applying the high-current load to the fuel cell stack while pressurizing hydrogen and air to respective predetermined pressurization set pressures and supplying the pressurized hydrogen and air to the fuel cell stack.

13. The method of claim 12, wherein one of the performing and the executing is selected and implemented depending on a cell voltage state of the fuel cell stack.

14. The method of claim 13, wherein the cell voltage state of the fuel cell stack is a cell voltage variation representing a difference between an average cell voltage and a minimum cell voltage of the fuel cell stack.

15. The method of claim 12, wherein, when a cell voltage variation representing a difference between an average cell voltage and a minimum cell voltage of the fuel cell stack is less than a predetermined first voltage, the performing is implemented, and wherein, when the cell voltage variation is greater than a predetermined second voltage, the executing is implemented.

16. The method of claim 15, wherein the first voltage is 0.1 V, and the second voltage is 0.3 V.

17. The method of claim 9, wherein, in the executing, the pressurization set pressure of the hydrogen supplied to the fuel cell stack is set to be higher than the pressurization set pressure of the air supplied to the fuel cell stack.

18. The method of claim 17, wherein, in the executing, the pressurization set pressure of the hydrogen is set to be higher than the pressurization set pressure of the air by 20 kPa.

19. The method of claim 9, wherein, in the executing, a flow rate of the hydrogen supplied to the fuel cell stack and a flow rate of the air supplied to the fuel cell stack are set to a ratio of 1.5 to 2.0.

20. The method of claim 1, wherein the predetermined current is 400 A.

* * * * *